W. T. DOREMUS.
Furniture Springs.

No. 153,761. Patented Aug. 4, 1874.

WITNESSES:

INVENTOR:
W. T. Doremus
BY
ATTORNEYS.

UNITED STATES PATENT OFFICE.

WILLIAM T. DOREMUS, OF NEW YORK, N. Y.

IMPROVEMENT IN FURNITURE-SPRINGS.

Specification forming part of Letters Patent No. 153,761, dated August 4, 1874; application filed June 13, 1874.

*To all whom it may concern:*

Figure 1:
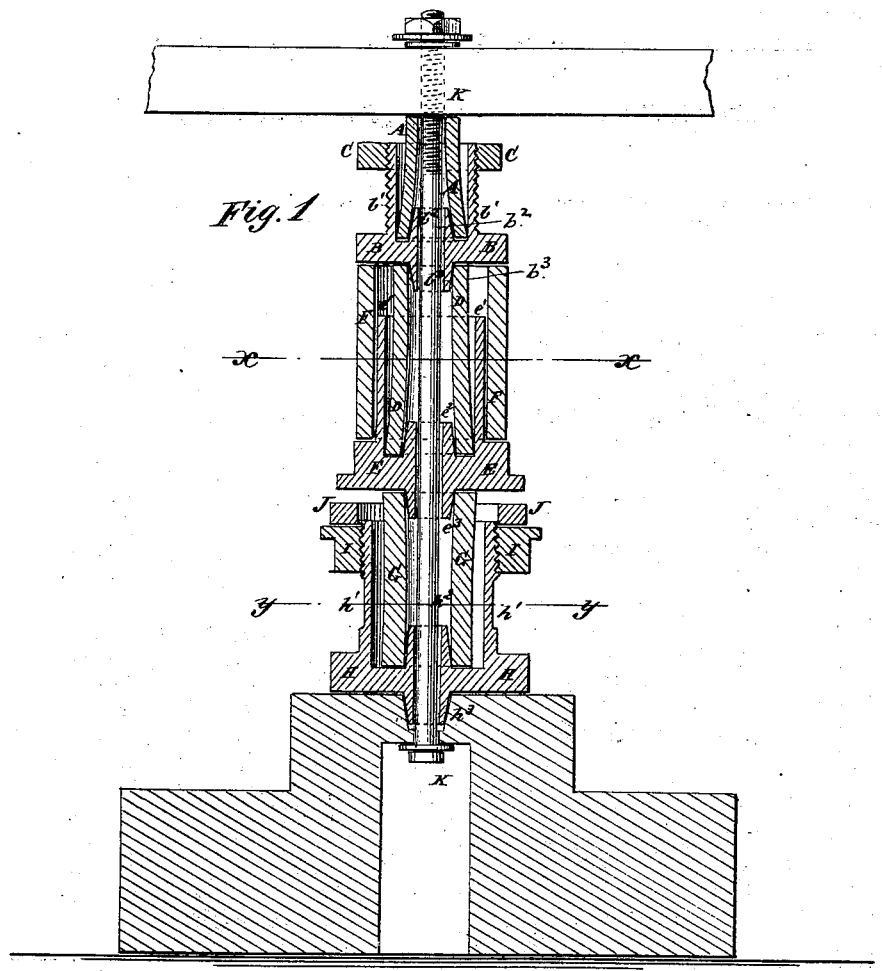
Figure 2:
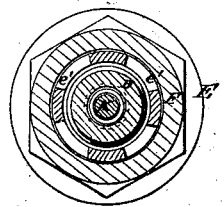
Figure 3:
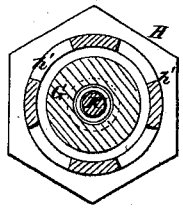

Be it known that I, WILLIAM T. DOREMUS, of the city, county, and State of New York, have invented a new and useful Improvement in Adjustable Graduated Spring, of which the following is a specification:

Figure 1 is a longitudinal section of my improved spring. Fig. 2 is a cross-section of the same, taken through the line $x\ x$, Fig. 1; and Fig. 3 is a cross-section of the same, taken through the line $y\ y$, Fig. 1.

My invention has for its object to furnish an improved spring for furniture and other uses, which shall be so constructed as to be elastic under a heavy or light weight, which will take the lighter springs out of pressure before they are compressed enough to injure their elasticity, and which may be adjusted to regulate the elasticity, as may be required.

The invention consists in the combination of two or more rigid disks, provided with tubular stop projections upon the outer part of their upper sides, and with tubular guide projections upon the central parts of their upper and lower sides, and two or more tubular rubber blocks with each other; in the combination of one or more adjustable stop-nuts with one or more of the tubular stop projections of the rigid disks; and in the combination of one or more rubber washers with one or more of the stop-nuts of the tubular stop projections of the disks, as hereinafter fully described.

A represents a tubular rubber block, the base of which rests upon a rigid disk, B, upon the upper side of which, around the base of the rubber A, is formed a tubular projection or case, $b^1$, which may be slotted, if desired, to diminish the amount of material, and which is made shorter than the rubber A. Upon the tube $b^1$ is formed a screw-thread, upon which is screwed a nut, C, which may be screwed up so as to project above the tube, to regulate the point at which the compression of the rubber A is stopped. The disk B has a tubular projection, $b^2$, formed upon its upper side to enter the rubber block A. The disk B rests upon the upper end of a tubular rubber block, D, and has a tubular projection, $b^3$, formed upon its lower side, which enters the upper end of the rubber D, and keeps it in place. The lower end of the rubber D rests upon its rigid disk E, which has two tubular projections, $e^1\ e^2$, formed upon its upper side, to form a ring-seat, for the said rubber tube D. The outer tubular projection $e^1$ is shorter than the rubber tube, so as to receive the disk B when the rubber D has been sufficiently compressed.

The rubber D may be re-enforced, when required, by a tubular rubber block, F, the lower end of which surrounds the tubular projection $e^1$, and rests upon the disk E, and upon its upper end rests the disk B.

The disk E rests upon the upper end of the tubular rubber block G, and has a tubular projection formed upon its lower side, which enters the upper end of the said rubber block G. The lower end of the rubber G rests upon the rigid disk H, which is provided with three projections, $h^1\ h^2\ h^3$, in the same manner and for the same purpose as the disks B and E. The projection $h^1$ may be provided with an adjustable stop-nut, I, in the same manner as the disk B, to enable the point at which the compression of the rubber G is stopped to be regulated as desired.

In cases where the stop-nuts I are used, a rubber-ring washer may be placed upon said nut, to prevent noise when the disk above is pressed down upon it. The projection $e^1$ may also be provided with a stop-nut, if desired, but in this case the rubber block F cannot be used. Other tubular rubber blocks and metallic disks may be used, if desired.

The rubber A is designed to be made the lightest, the rubber D heavier, and so on, each lower rubber being made heavier than the one above it.

The two upper disks and their rubbers may be used alone, if desired, and when more strength is required, an additional rubber, F, may be used, or other disks and other rubbers may be added, until the desired strength is obtained.

K is a guide-bolt, which passes up through the center of the spring, to connect the two objects between which the spring is placed, but which will not be required when said objects have other guides to keep them in place.

Having thus described my invention, I claim as new and desire to secure by Letters Patent—

1. The combination of two or more rigid disks, B E H, provided with tubular stop projections upon the outer part of their upper sides, and with tubular guide projections upon the central parts of their upper and lower sides, and the two or more rubber blocks A D G with each other, substantially as herein shown and described.

2. The combination of one or more adjustable stop-nuts, I, with one or more of the tubular stop projections of the rigid disks H E B, substantially as herein shown and described.

3. The combination of one or more rubber washers, J, with one or more of the stop-nuts I, of the tubular stop projections of the disks H E B, substantially as herein shown and described.

WILLIAM T. DOREMUS.

Witnesses:
JAMES T. GRAHAM,
A. W. ALMQVIST.